US012770794B2

(12) United States Patent
Kitahara et al.

(10) Patent No.: US 12,770,794 B2
(45) Date of Patent: Oct. 20, 2026

(54) MULTILAYER CERAMIC CAPACITOR

(71) Applicant: Murata Manufacturing Co., Ltd., Nagaokakyo (JP)

(72) Inventors: Keita Kitahara, Nagaokakyo (JP); Masahiro Wakashima, Nagaokakyo (JP); Takefumi Takahashi, Nagaokakyo (JP); Yuuta Takagi, Nagaokakyo (JP); Syouta Ikebe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 149 days.

(21) Appl. No.: 18/760,090

(22) Filed: Jul. 1, 2024

(65) Prior Publication Data

US 2024/0355552 A1 Oct. 24, 2024

Related U.S. Application Data

(63) Continuation of application No. PCT/JP2023/020144, filed on May 30, 2023.

(30) Foreign Application Priority Data

Sep. 2, 2022 (JP) ................................ 2022-139915

(51) Int. Cl.
*H01G 4/30* (2006.01)
*H01G 2/06* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1227* (2013.01); *H01G 4/232* (2013.01)

(58) Field of Classification Search
CPC .......... H01G 4/30; H01G 2/065; H01G 4/008; H01G 4/012; H01G 4/1227; H01G 4/0085;
(Continued)

(56) References Cited

U.S. PATENT DOCUMENTS 12,080,487 B2 * 9/2024 Doi ........................ H01G 4/232
2007/0109718 A1 5/2007 Horie et al.
(Continued)

FOREIGN PATENT DOCUMENTS

JP H08102425 A 4/1996
JP H08203769 A 8/1996
(Continued)

OTHER PUBLICATIONS

International Search Report in PCT/JP2023/020144, mailed Aug. 29, 2023, 3 pages.
(Continued)

*Primary Examiner* — Dion R. Ferguson
(74) *Attorney, Agent, or Firm* — Keating & Bennett, LLP

(57) ABSTRACT

A multilayer ceramic capacitor includes a multilayer body including dielectric layers and internal electrode layers alternately laminated, and external electrodes each on a corresponding one of two end surfaces opposed to each other in a length direction perpendicular or substantially perpendicular to a lamination direction of the multilayer body. The external electrodes are each connected to the internal electrode layers. Each of the external electrodes includes a stack including a base electrode layer on a corresponding one of the two end surfaces, a Ni plated layer on the base electrode layer, and a Sn plated layer on the Ni plated layer. Each of the external electrodes includes a region in which Sn is deposited between the base electrode layer and the Ni plated layer.

13 Claims, 5 Drawing Sheets

(51) Int. Cl.

| | |
|---|---|
| ***H01G 4/008*** | (2006.01) |
| ***H01G 4/012*** | (2006.01) |
| ***H01G 4/12*** | (2006.01) |
| ***H01G 4/232*** | (2006.01) |

(58) Field of Classification Search
CPC .... H01G 4/232; H01G 4/2325; H01G 4/1209; Y02E 60/13
See application file for complete search history.

(56) References Cited

U.S. PATENT DOCUMENTS

| | | | | |
|---|---|---|---|---|
| 2017/0032896 A1* | 2/2017 | Otani | H01G 4/30 | |
| 2017/0301468 A1* | 10/2017 | Kim | H01G 4/30 | |
| 2019/0355518 A1* | 11/2019 | Harada | H01G 4/30 | |
| 2021/0193386 A1* | 6/2021 | Dozen | C22C 9/00 | |
| 2023/0207214 A1* | 6/2023 | Doi | H01G 4/30 | 361/321.2 |
| 2023/0223198 A1* | 7/2023 | Kanzaki | H01G 4/1227 | 361/305 |
| 2024/0355552 A1* | 10/2024 | Kitahara | H01G 4/30 | |

FOREIGN PATENT DOCUMENTS

| | | | |
|---|---|---|---|
| JP | 2021100019 | A | 7/2021 |
| KR | 20060032210 | A | 4/2006 |
| WO | 2005083727 | A1 | 9/2005 |

OTHER PUBLICATIONS

Written Opinion in PCT/JP2023/020144, mailed Aug. 29, 2023, 4 pages.

* cited by examiner

MULTILAYER CERAMIC CAPACITOR

CROSS REFERENCE TO RELATED APPLICATIONS

This application claims the benefit of priority to Japanese Patent Application No. 2022-139915 filed on Sep. 2, 2022 and is a Continuation Application of PCT Application No. PCT/JP2023/020144 filed on May 30, 2023. The entire contents of each application are hereby incorporated herein by reference.

BACKGROUND OF THE INVENTION

1. Field of the Invention

The present invention relates to multilayer ceramic capacitors.

2. Description of the Related Art

Conventionally, in order to mount each multilayer ceramic capacitor on a wiring board, external electrodes electrically connected to internal electrode layers are provided on a surface of a ceramic element body in which the internal electrode layers are embedded (for example, refer to Japanese Unexamined Patent Application, Publication No. H8-102425). Each of the external electrodes usually includes a base electrode layer including an electrically conductive metal and glass, and in order to prevent erosion by solder used in mounting on an electric circuit, the surface of the base electrode layer is covered with a Ni plated layer or a Sn plated layer.

An electrolytic plating method is generally used to form a plated layer. In the electrolytic plating method, a plated layer is formed so as to cover the base electrode layer by depositing and growing a plating film with an electrically conductive metal exposed on the surface of the base electrode layer as a core, but if the deposited plating film is uneven, a uniform plated layer will not be formed, and when the multilayer body is mounted on a wiring board, the multilayer body will be damaged by erosion of solder, resulting in failure of the multilayer ceramic capacitor.

On the other hand, although it is conceivable to form a thick plating film in order to improve the film-forming property of the plating film, the increase in the current in electrolytic plating and the extension of the electrolytic plating treatment time tend to cause variations in the thickness of the plated layer in mass production, making it difficult to maintain the quality constant. In addition, in order to maintain the dimensions of the multilayer ceramic capacitor within the standard dimensions, it is necessary to further reduce the thickness of the ceramic body by the thickness of the plating film. As a result, the thickness of the ceramic element body is further reduced, and thus the capacitance of the multilayer ceramic capacitor decreases.

SUMMARY OF THE INVENTION

Example embodiments of the present invention provide multilayer ceramic capacitors each including an external electrode that is able to reliably cover the surface of a base electrode layer with a plated layer.

The inventors of example embodiments of the present invention have discovered that deposition and growth of a plating film smoothly proceed by providing a region in which Sn is deposited on a surface of a base electrode layer of an external electrode.

An example embodiment of the present invention provides a multilayer ceramic capacitor that includes a multilayer body including a plurality of dielectric layers and a plurality of internal electrode layers that are alternately laminated, and external electrodes each on a corresponding one of two end surfaces opposed to each other in a length direction perpendicular or substantially perpendicular to a lamination direction of the multilayer body, the external electrodes each being connected to the plurality of internal electrode layers. Each of the external electrodes includes a stack including a base electrode layer on a corresponding one of the two end surfaces, a Ni plated layer on the base electrode layer, and a Sn plated layer on the Ni plated layer, and each of the external electrodes includes a region in which Sn is deposited between the base electrode layer and the Ni plated layer.

According to example embodiments of the present invention, it is possible to provide multilayer ceramic capacitors each including an external electrode that is able to reliably cover the surface of a base electrode layer with a plated layer.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
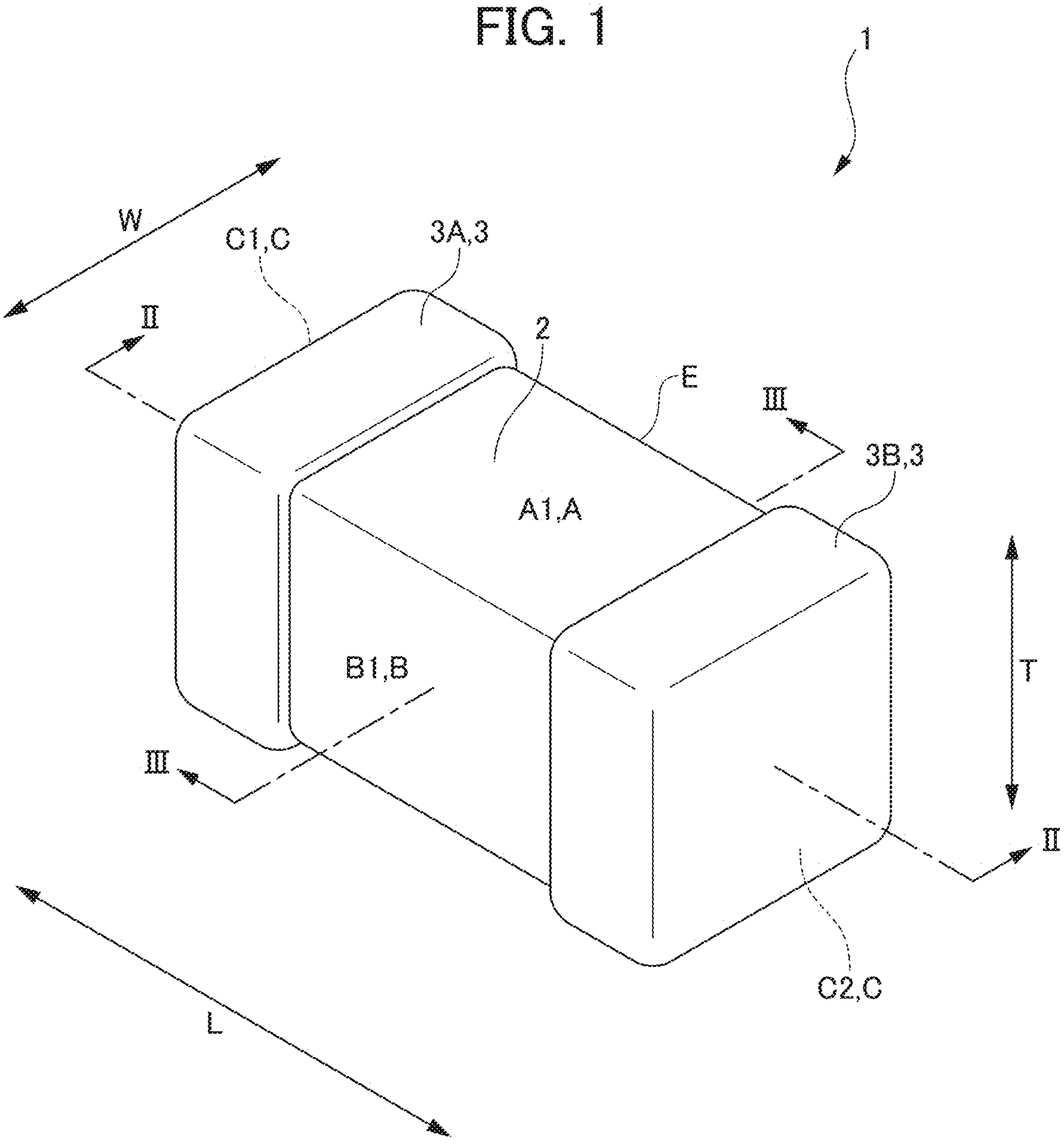
FIG. 1 is a schematic perspective view of a multilayer ceramic capacitor 1 according to an example embodiment of the present invention.

Hereinafter, multilayer ceramic capacitors according to example embodiments of the present invention will be described. However, the present invention is not limited thereto. In addition, the drawings may be schematically simplified and drawn in order to explain the contents of example embodiments of the present invention, and the drawn components or the ratio of the dimensions between the components may not coincide with the ratio of the dimensions described in the specification. In addition, components described in the specification may be omitted in the drawings or may be drawn with the number of components omitted.

Multilayer Ceramic Capacitor 1

Figure 2:
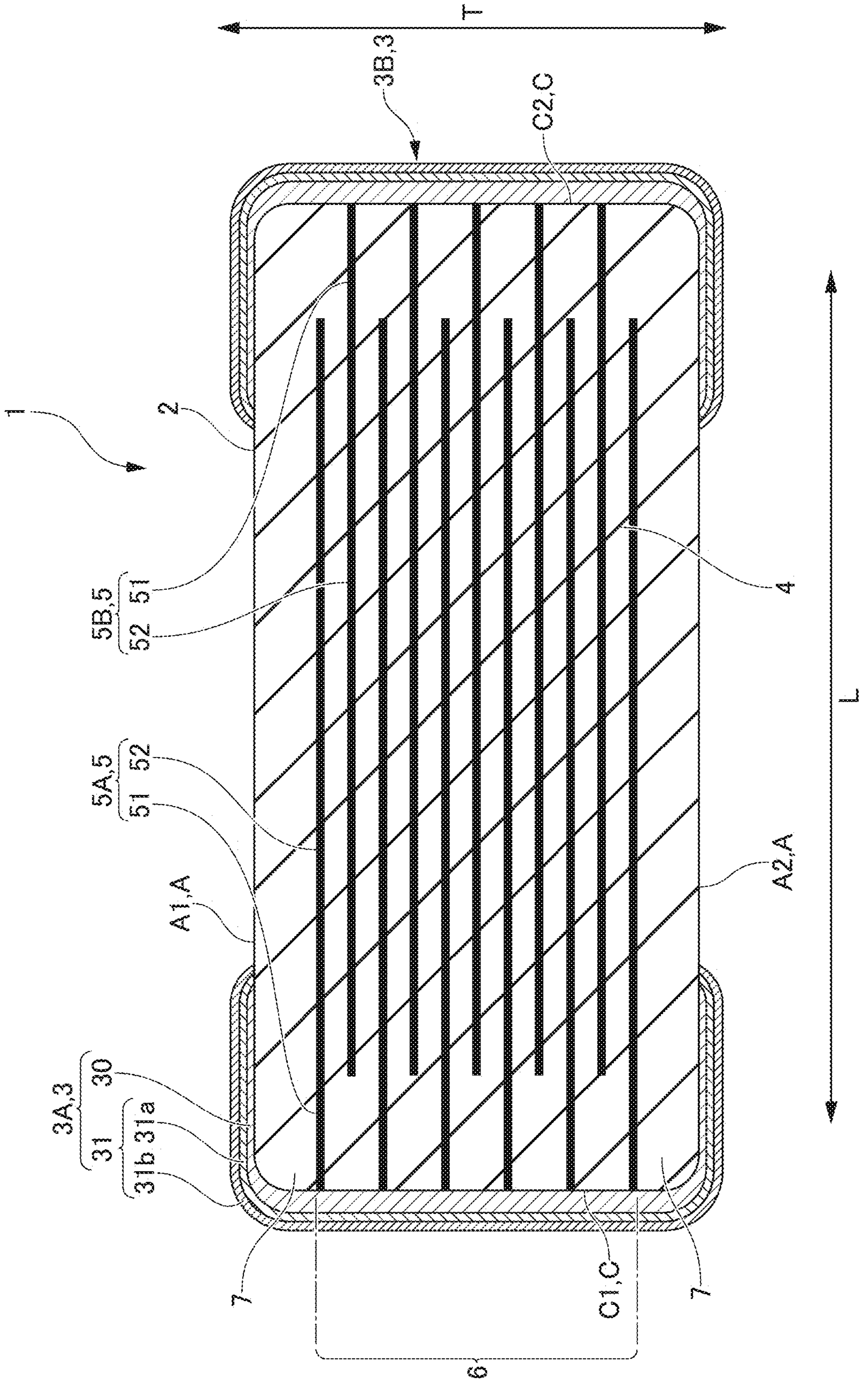
FIG. 2 is a cross-sectional view taken along the line II-II of the multilayer ceramic capacitor 1 shown in FIG. 1.
Figure 3:
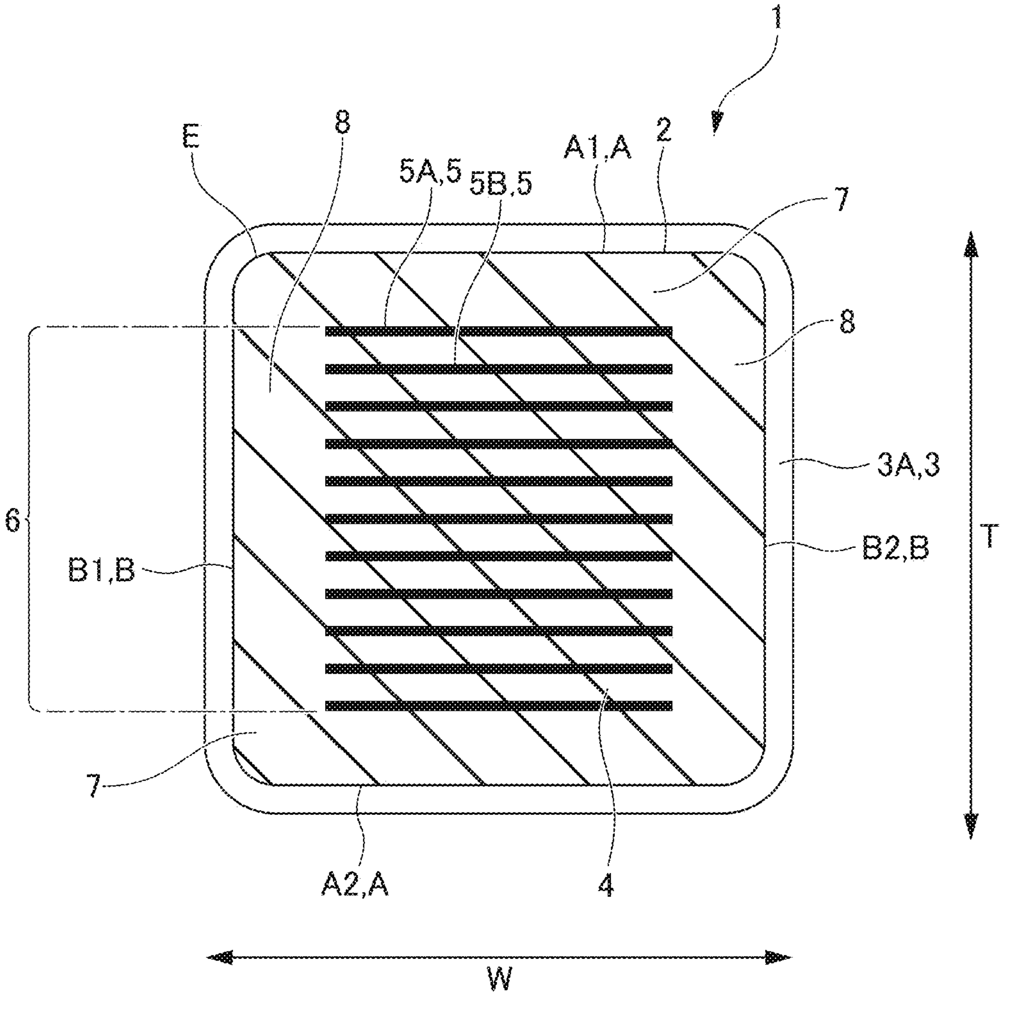
FIG. 3 is a cross-sectional view taken along line III-III of the multilayer ceramic capacitor 1 shown in FIG. 1.

FIGS. 1 to 3 show the shape and configuration of a multilayer ceramic capacitor 1 according to an example embodiment of the present invention. FIG. 1 is a schematic perspective view of the multilayer ceramic capacitor 1. FIG.

Figure 4:
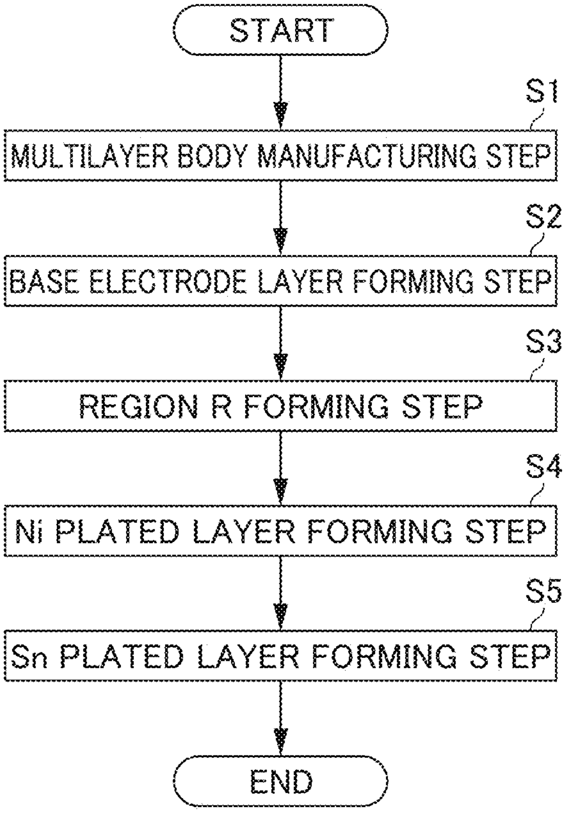
FIG. 4 is a flowchart of a method of manufacturing the multilayer ceramic capacitor 1 according to an example embodiment of the present invention.
Figure 5:
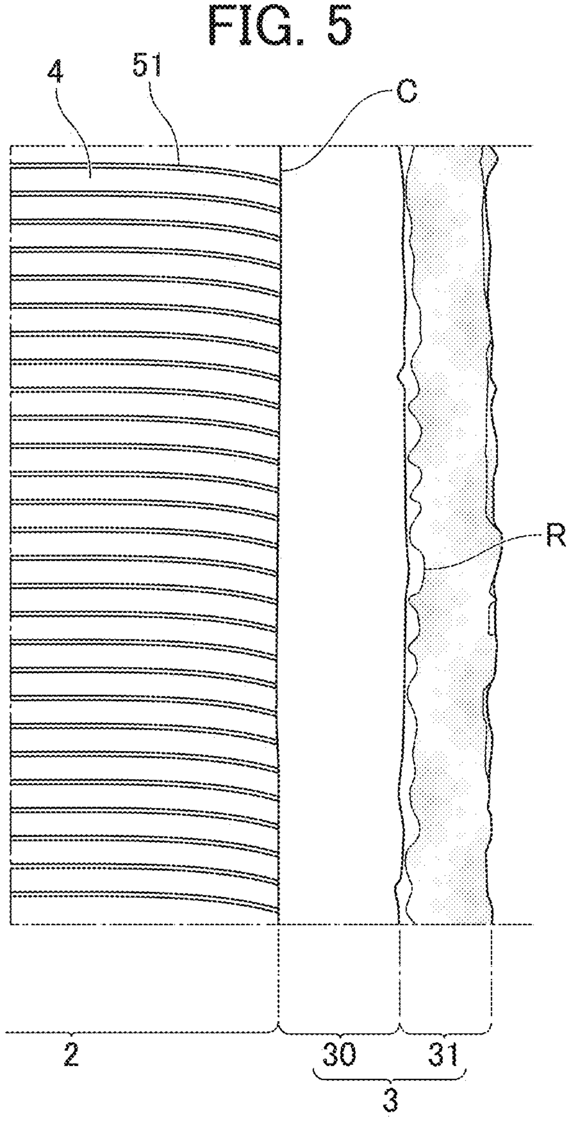
FIG. 5 is a view showing a state of a cross section of an external electrode 3 observed by an electron microscope.

2 is a cross-sectional view (LT cross-sectional view) of the multilayer ceramic capacitor 1 taken along the line II-II of the middle portion in the width direction W shown in FIG. 1. FIG. 3 is a cross-sectional view (WT cross-sectional view) of the multilayer ceramic capacitor 1 taken along the line III-III in FIG. 1. FIG. 4 is a flowchart of a method of manufacturing the multilayer ceramic capacitor 1 according to an example embodiment of the present invention. FIG. 5 is a view showing a state of a cross section of the external electrode 3 observed by an electron microscope. In addition, the configuration of the multilayer ceramic capacitor 1 will be described with reference to a lamination (stacking) direction T defined as a direction in which the dielectric layers and the internal electrode layers are laminated, a length direction L defined as a direction perpendicular or substantially perpendicular to the lamination direction T, and a width direction W defined as a direction perpendicular or substantially perpendicular to the lamination direction T and the length direction L. In example embodiments of the present invention, the width direction W, the length direction L, and the lamination direction T are orthogonal or substantially orthogonal to each other, but are not necessarily orthogonal to each other, and may intersect each other.

The multilayer ceramic capacitor 1 has a rectangular or substantially rectangular parallelepiped shape and includes a multilayer body 2 and a pair of external electrodes 3 provided at both ends of the multilayer body 2. The multilayer body 2 includes an inner layer portion 6 including a plurality of sets of dielectric layers 4 and internal electrode layers 5.

Among the six outer surfaces of the multilayer body 2, a pair of outer surfaces opposed to each other in the lamination direction T is defined as a first main surface A1 and a second main surface A2, a pair of outer surfaces opposed to each other in the width direction W is defined as a first lateral surface B1 and a second lateral surface B2, and a pair of outer surfaces opposed to each other in the length direction L is defined as a first end surface C1 and a second end surface C2.

The first main surface A1 and the second main surface A2 are collectively referred to as a main surface A, the first lateral surface B1 and the second lateral surface B2 are collectively referred to as a lateral surface B, and the first end surface C1 and the second end surface C2 are collectively referred to as an end surface C.

Multilayer Body 2

The multilayer body 2 includes an inner layer portion 6, outer layer portions 7 that sandwich the inner layer portion 6 and are provided adjacent to the main surfaces A, and side gap portions 8. In the multilayer body 2, it is preferable that ridge portions E are rounded. Each of the ridge portions E refers to a portion where the two surfaces of the multilayer body 2, that is, the main surface A and the lateral surface B, the main surface A and the end surface C, or the lateral surface B and the end surface C intersect with each other, and also includes corner portions where the main surface A, the lateral surface B, and the end surface C intersect with each other.

Inner Layer Portion 6

The inner layer portion 6 includes a plurality of sets of dielectric layers 4 and internal electrode layers 5 alternately laminated along the lamination direction T.

Dielectric Layer 4

Each of the dielectric layers 4 is made of a ceramic material. As the ceramic material, for example, a dielectric ceramic including $BaTiO_3$ as a main component is used. Further, as the ceramic material, a material obtained by adding at least one subcomponent such as, for example, a Mn compound, a Fe compound, a Cr compound, a Co compound, and a Ni compound to these main components may be used.

Internal Electrode Layer 5

Each of the internal electrode layers 5 is preferably made of a metal material such as, for example, Ni, Cu, Ag, Pd, an Ag—Pd alloy, Au, or the like.

The internal electrode layers 5 include a plurality of first internal electrode layers 5A and a plurality of second internal electrode layers 5B. The first internal electrode layers 5A and the second internal electrode layers 5B are alternately provided. When it is not necessary to particularly distinguish between the first internal electrode layer 5A and the second internal electrode layer 5B, they are collectively described as the internal electrode layer 5.

Each of the internal electrode layers 5 includes a counter portion 52 that is opposed to each other between the first internal electrode layer 5A and the second internal electrode layer 5B, and an extension portion 51 that is not opposed to each other between the first internal electrode layer 5A and the second internal electrode layer 5B. Each of the extension portions 51 extends from the counter portion 52 toward a corresponding one of the end surfaces C, and is exposed at a corresponding one of the end surfaces C. Each of the extension portions 51 includes an end portion that is exposed at the end surface C and is electrically connected to the external electrode 3. The directions in which the extension portions 51 extend differ between the first internal electrode layers 5A and the second internal electrode layers 5B, and the extension portions extend alternately toward the first end surface C1 and the second end surface C2 and are exposed at them. Charges are accumulated between the counter portions 52 of the first internal electrode layers 5A and the second internal electrode layers 5B adjacent to one another in the lamination direction T, and define and function as a capacitor.

Outer Layer Portion 7

The outer layer portions 7 sandwich the inner layer portion 6 and are provided adjacent to both main surfaces A. The outer layer portions 7 are made of the same material as the dielectric layers 4 of the inner layer portion 6.

Side Gap Portion 8

The side gap portions 8 sandwich the inner layer portion 6 and are provided adjacent to both lateral surfaces B of the multilayer body 2. The side gap portion 8 is integrally made of the same material as the dielectric layers 4.

External Electrode 3

The external electrodes 3 are provided on both end surfaces C of the multilayer body 2. Each of the external electrodes 3 covers not only the end surface C, but also a portion of the main surface A and a portion of the lateral surface B adjacent to the end surface C. Each of the external electrodes 3 includes a base electrode layer 30 and a plated layer 31 provided on the surface of the base electrode layer 30.

Base Electrode Layer 30

The base electrode layer 30 is electrically connected to each of the end portions of the extension portions 51 of the internal electrode layers 5 exposed at the end surface C. The base electrode layer preferably includes an electrically conductive metal and either glass or ceramic, or both glass and ceramic. In the present example embodiment, the base electrode layer 30 includes an electrically conductive metal and glass, for example. With such a configuration, the adhesion between the end surface C of the multilayer body 2 and the base electrode layer 30 is improved, and infiltration of moisture into the multilayer body 2 can be reduced or prevented.

The electrically conductive metal for manufacturing the base electrode layer includes, for example, at least one of Cu, Ni, Ag, Pd, an Ag—Pd alloy, Au, and the like.

The glass for manufacturing the base electrode layer 30 includes at least one of B, Si, Ba, Mg, Al, or Li, or the like. In a case of including a ceramic component, a ceramic component of the same type as the dielectric layer or a ceramic component of a different type may be used as the ceramic component.

Region R

A region R in which Sn is deposited is provided on the surface of the electrically conductive metal exposed on the surface of the base electrode layer 30. The region R is provided, for example, by depositing Sn, an alloy of Sn and Ni, or the like by an electroless plating method or the like described later.

FIG. 5 shows a cross-sectional state of the external electrode 3 observed with an electron microscope, and the region R protrudes from the surface of the base electrode layer 30 at a height of, for example, about 0.1 μm to about 3.0 μm. The region R defines and functions as a nucleus to form the Ni plated layer 31*a*, and the Ni plated layer 31*a* can be smoothly formed.

Plated Layer 31

The plated layer 31 includes, for example, a Ni plated layer 31*a* provided so as to cover the surface of the base electrode layer 30 and the region R, and a Sn plated layer 31*b* provided so as to cover the Ni plated layer 31*a*. The Ni plated layer 31*a* is formed by, for example, plating Ni or an alloy including Ni. The Ni plated layer 31*a* prevents the base electrode layer 30 from being eroded by solder. The Sn plated layer 31*b* is formed by, for example, plating Sn or an alloy including Sn. The formation of the Sn plated layer 31*b* improves the wettability of solder when the multilayer ceramic capacitor 1 is mounted on a wiring board, which facilitates mounting.

The molar ratio of Sn to Ni (Sn/Ni) in the region R measured by energy dispersive X-ray spectroscopy (EDX) is, for example, preferably about 0.2 or more and about 0.4 or less. By providing the region R with such a molar ratio (Sn/Ni), it is possible to stably provide the region R during mass production, and it is also possible to smoothly laminate the Ni plated layer 31*a* on the surface of the base electrode layer 30.

Manufacturing Method of Multilayer Ceramic Capacitor 1

Next, an example of a method of manufacturing the multilayer ceramic capacitor 1 according to the present example embodiment will be described. FIG. 4 is a flowchart of a method of manufacturing the multilayer ceramic capacitor 1. The manufacturing step of the multilayer ceramic capacitor 1 includes a multilayer body manufacturing step S1, a base electrode layer forming step S2, a region R forming step S3, a Ni plated layer forming step S4, and a Sn plated layer forming step S5.

Multilayer Body Manufacturing Step S1

First, in the multilayer body manufacturing step S1, a material sheet is prepared in which a pattern of the internal electrode layers 5 is printed with an electrical conductor paste on a ceramic green sheet for lamination in which a ceramic slurry is formed into a sheet shape. Then, the plurality of material sheets are laminated so that the internal electrode patterns are shifted by about a half pitch in the length direction between the adjacent material sheets. Further, ceramic green sheets for manufacturing the outer layer portions are laminated on both sides of the plurality of laminated material sheets, respectively, and the resulting product is subjected to, for example, thermocompression bonding to form a mother block member. A plurality of multilayer chips are manufactured by dividing the mother block member along cutting lines corresponding to the dimensions of the multilayer body. Thereafter, the multilayer chip is, for example, barrel-polished to round corner portions and ridge portions, and then fired. Thus, the ceramic material and the metal material included in the multilayer chip are fired to form the multilayer body 2 including the plurality of dielectric layers 4 and the plurality of internal electrode layers 5.

Base Electrode Layer Forming Step S2

Next, in the base electrode layer forming step S2, the base electrode layer 30 is formed on both end portions of the multilayer body 2. The base electrode layer 30 is formed by, for example, applying an electrically conductive paste including an electrically conductive metal and glass to both end portions of the multilayer body 2, and firing the resulting product. The base electrode layer may be formed by simultaneously firing the multilayer chip and the electrically conductive paste applied to the multilayer chip, or may be formed by firing the multilayer chip to obtain the multilayer body 2, and then applying the electrically conductive paste to the multilayer body 2 and firing the resulting product. As shown in FIG. 2, the base electrode layers 30 extend not only to the end surfaces C on both sides of the multilayer body 2, but also to the main surface A to cover a portion of the main surface A adjacent to the end surfaces C.

Region R Forming Step S3

The region R can be formed by, for example, electroless plating by immersion. The multilayer body 2 on which the base electrode layers 30 are formed is immersed in a plating bath to deposit Sn on the surfaces of the electrically conductive metal exposed on the surfaces of the base electrode layers 30. The metal to be deposited may not only be Sn, but, for example, also an alloy of Sn and Ni. These metals are supplied as cationic species in the plating bath. In the plating bath, although both the metal salt and the reducing agent are present in the bath, the metal layer is deposited by the action of the reducing agent added to the aqueous solution of the metal salt and covers the surfaces of the electrically conductive metal exposed on the surfaces of the base electrode layers. The region R can also be formed by, for example, electrolytic plating or other plating.

Ni Plated Layer Forming Step S4

In the Ni plated layer forming step S3, the Ni plated layer 31*a* is formed to cover the surface of each of the base electrode layers 30 in which the region R is formed. The Ni plated layer 31*a* is preferably formed by, for example, electrolytic plating. Barrel plating, for example, can be used as the plating method.

Sn Plated Layer Forming Step S5

Next, the Sn plated layer 31*b* is formed to cover the Ni plated layer 31*a*. The Sn plated layer 31*b* is preferably formed by, for example, electrolytic plating. Barrel plating, for example, can be used as the plating method.

Through the above steps, the multilayer ceramic capacitor 1 in which the external electrodes 3 are formed on the multilayer body 2 is manufactured.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising: a multilayer body including at least one dielectric layer and at least one internal electrode layer; and at least one external electrode on the multilayer body, and connected to the at least one internal electrode layer; wherein the at least one external electrode includes a stack including: a base electrode layer on the multilayer body; a Ni plated layer on the base electrode layer; and a Sn plated layer on the Ni plated layer; a region in which Sn is deposited is between the base electrode layer and the Ni plated layer; and the region in which the Sn is deposited variably protrudes from a surface of the base electrode layer at a height of 0.1 μm to 3.0 μm.

2. The multilayer ceramic capacitor according to claim 1, wherein a molar ratio of Sn to Ni (Sn/Ni) in the region in which the Sn is deposited measured by energy dispersive X-ray spectroscopy (EDX) is about 0.2 or more and about 0.4 or less.

3. The multilayer ceramic capacitor according to claim 1, wherein the multilayer body includes an inner layer portion, outer layer portions sandwiching the inner layer portion in the lamination direction, and side gap portions sandwiching the inner layer portion in a width direction perpendicular or substantially perpendicular to the lamination direction and the length direction.

4. The multilayer ceramic capacitor according to claim 3, wherein the inner layer portion includes a plurality of sets of the at least one dielectric layer and the at least one internal electrode layer.

5. The multilayer ceramic capacitor according to claim 1, wherein each of the at least one dielectric layer includes $BaTiO_3$ as a main component.

6. The multilayer ceramic capacitor according to claim 5, wherein each of the at least one dielectric layer includes at least one of Mn compound, a Fe compound, a Cr compound, a Co compound, and a Ni compound as a subcomponent.

7. The multilayer ceramic capacitor according to claim 1, wherein each of the at least one internal electrode layer includes Ni, Cu, Ag, Pd, an Ag—Pd alloy, or Au.

8. The multilayer ceramic capacitor according to claim 4, wherein the outer layer portions includes a same material as that of the at least one dielectric layer of the inner layer portion.

9. The multilayer ceramic capacitor according to claim 4, wherein the side gap portions includes same material as that of the at least one dielectric layer of the inner layer portion.

10. The multilayer ceramic capacitor according to claim 1, wherein the base electrode layer includes an electrically conductive metal and at least one of glass or ceramic.

11. The multilayer ceramic capacitor according to claim 10, wherein the base electrode layer includes the electrically conductive metal and the glass.

12. The multilayer ceramic capacitor according to claim 10, wherein the electrically conductive metal includes at least one of Cu, Ni, Ag, Pd, an Ag—Pd alloy, or Au.

13. The multilayer ceramic capacitor according to claim 11, wherein the glass includes at least one of B, Si, Ba, Mg, Al, or Li.

* * * * *